US006441946B1

(12) United States Patent
Sheridon

(10) Patent No.: US 6,441,946 B1
(45) Date of Patent: Aug. 27, 2002

(54) SWOLLEN GYRICON DISPLAYS AND METHOD OF MAKING SAME

(75) Inventor: Nicholas K. Sheridon, Los Altos, CA (US)

(73) Assignee: Xerox Corporation, Stamford, CT (US)

( * ) Notice: Subject to any disclaimer, the term of this patent is extended or adjusted under 35 U.S.C. 154(b) by 46 days.

(21) Appl. No.: 09/723,204

(22) Filed: Nov. 28, 2000

(51) Int. Cl.⁷ .................... G02B 26/00; B01J 13/02
(52) U.S. Cl. .................... 359/296; 427/213.34
(58) Field of Search .................... 359/296; 345/85, 345/107; 349/86; 427/213.3, 213.31, 213.34, 213.36; 428/323, 327, 402.21, 407; 264/4.7, 343; 523/207, 210

(56) References Cited

U.S. PATENT DOCUMENTS

| 4,261,653 A | 4/1981 | Goodrich | 359/296 |
|---|---|---|---|
| 5,037,716 A | 8/1991 | Moffat | 430/109 |
| 5,262,098 A | 11/1993 | Crowley et al. | 264/8 |
| 5,344,594 A | 9/1994 | Sheridon | 264/4.1 |
| 5,389,945 A | 2/1995 | Sheridon | 345/85 |
| 5,717,514 A | 2/1998 | Sheridon | 359/296 |
| 5,754,332 A * | 5/1998 | Crowley | 345/107 |
| 5,815,306 A | 9/1998 | Sheridon et al. | 359/296 |
| 5,989,629 A | 11/1999 | Sacripante et al. | 427/180 |
| 6,097,531 A | 8/2000 | Sheridon | 359/296 |
| RE37,085 E * | 3/2001 | Sheridon | 264/4 |

* cited by examiner

Primary Examiner—Evelyn A Lester
(74) Attorney, Agent, or Firm—Oliff & Berridge, PLC

(57) ABSTRACT

A gyricon sheet includes a binder containing rotating elements, wherein the binder is swollen with dielectric fluids so as to have cavities larger than the rotating elements around each of the rotating elements, the cavities filled with the dielectric fluids, and wherein the dielectric fluids comprise a mixture of at least two liquids having different binder swelling capabilities. By selection of the mixture of dielectric liquids, the extent of swelling of the gyricon sheet can be precisely controlled, enabling the gyricon sheet to exhibit a high level of display brightness.

11 Claims, 1 Drawing Sheet

SWOLLEN GYRICON DISPLAYS AND METHOD OF MAKING SAME

BACKGROUND OF THE INVENTION

1. Field of the Invention

The present invention relates to visual displays, particularly to addressable, reusable, paper-like visual displays, and more particularly to gyricon or twisting-ball displays.

2. Discussion of Related Art

A gyricon display, also called the twisting-ball display, rotary ball display, particle display, dipolar particle light valve, etc., offers a technology for making a form of electric paper. Briefly, a gyricon display is an addressable display made up of a multiplicity of optically anisotropic balls, each of which can be selectively rotated to present a desired face to an observer. For example, a gyricon display can incorporate balls each having two distinct hemispheres, one black and the other white, with each hemisphere having a distinct electrical characteristic (e.g., zeta potential with respect to a dielectric fluid) so that the balls are electrically as well as optically anisotropic. The black-and-white balls are embedded in a sheet of optically transparent material, such as an elastomer layer, that contains a multiplicity of spheroidal cavities and is permeated by a transparent dielectric fluid, such as a plasticizer. The fluid-filled cavities accommodate the balls, one ball per cavity, so as to prevent the balls from migrating within the sheet. A ball can be selectively rotated within its respective fluid-filled cavity, for example by application of an electric field, so as to present either the black or the white hemisphere to an observer viewing the surface of the sheet. Thus, by application of an electric field addressable in two dimensions (as by a matrix addressing scheme), the black and white sides of the balls can be caused to appear as the image elements (e.g., pixels or subpixels) of a displayed image.

An exemplary gyricon display 10 is shown in side view in FIG. 1. Bichromal balls 11 are disposed in an elastomer binder of the sheet 12 that is swelled by a dielectric fluid creating cavities 13 in which the balls 11 are free to rotate. The balls 11 are electrically dipolar in contact with the fluid and so are subject to rotation upon application of an electric field, as by matrix-addressable electrodes 14a, 14b. The electrode 14a closest to viewing surface 15 is preferably transparent. An observer at I sees an image formed by the black and white pattern of the balls 11 as rotated to expose their black or white faces (hemispheres) to the viewing surface 15 of sheet 12.

U.S. Pat. No. 5,389,945, incorporated by reference herein, shows that gyricon displays can be made that have many of the desirable qualities of paper, such as flexibility and stable retention of a displayed image in the absence of power, not found in CRTs, LCDs, or other conventional display media. Gyricon displays can also be made that are not paper-like, for example, in the form of rigid display screens for flat-panel displays.

Typically, known gyricon displays are made up of bichromal balls that are black on one hemisphere and white on the other. Other kinds of rotating elements are also known. For example, U.S. Pat. No. 4,261,653 shows a multilayer sphere, although it is made at least in part from glass and its use depends on an addressing scheme involving high-frequency electric fields.

Other commonly owned patents related to gyricon displays, each incorporated herein by reference in their entireties, include U.S. Pat. Nos. 5,262,098; 5,344,594; 5,717,514; 5,815,306; 5,989,629 and 6,097,531.

In making the gyricon sheet of the gyricon display, the binder, typically an elastomer, of the sheet is soaked in the dielectric fluid after it is cured. This swells the binder to create the cavities 13 slightly larger than and surrounding the spheres 11, which cavities are filled with the dielectric fluid.

What is still needed is a reliable method of controlling the extent of the swelling of the gyricon sheet.

SUMMARY OF THE INVENTION

It is therefore an object of the present invention to develop a method of making a gyricon sheet in which the swelling of the sheet with a dielectric fluid is precisely controlled.

It is a further object of the present invention to achieve a gyricon sheet that exhibits a high display brightness.

These and other objects of the present invention are achieved herein by swelling the binder of the gyricon sheet with dielectric fluids comprised of a mixture of at least two liquids, wherein the liquids possess different levels of swelling the binder, i.e., possess different binder swelling capabilities. In particular, a first liquid is a liquid that swells the binder to a higher degree than a second liquid. The second liquid may not swell the binder at all, or may swell the binder to only a relatively small degree.

The invention also pertains to a method of making a gyricon sheet in which the mixture of at least two liquids comprises at least one volatile liquid having a binder swelling capability and at least one non-volatile liquid having no binder swelling capability, and wherein after swelling the binder with the mixture, the method further comprises evaporating off the at least one volatile liquid. In this method, the resulting gyricon sheet contains only the non-volatile non-swelling dielectric liquid.

The invention also pertains to a gyricon sheet comprising a binder containing rotating elements, wherein the binder is swollen with dielectric fluids so as to have cavities larger than the rotating elements around each of the rotating elements, the cavities filled with the dielectric fluids, and wherein the dielectric fluids comprise a mixture of at least two liquids having different binder swelling capabilities.

By selection of the mixture of dielectric liquids, the extent of swelling of the gyricon sheet in the process can be precisely controlled, enabling the gyricon sheet to exhibit a high level of display brightness.

BRIEF DESCRIPTION OF THE DRAWING

The FIGURE is a cutaway view of a black-and-white gyricon display.

DETAILED DESCRIPTION OF PREFERRED EMBODIMENTS

Figure 1:
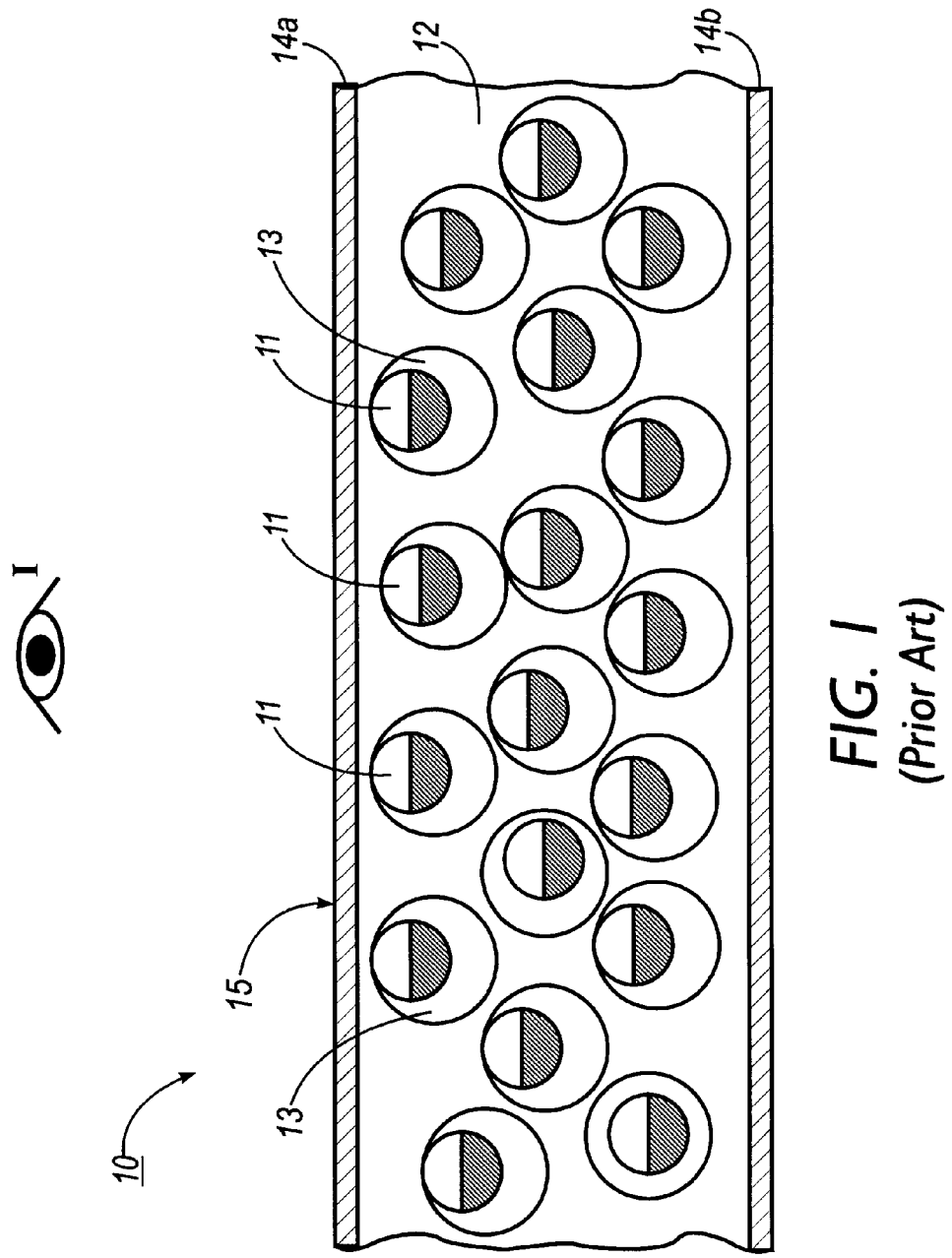

A gyricon sheet typically comprises spherically symmetric rotating elements with anisotropic electrical and optical properties. For example, as shown in the FIGURE, rotating elements 11 can be made to rotate and thus exhibit changes in optical properties by the imposition of external electrical fields. Each of the rotating elements 11 are located in individual fluid filled cavities 13 in a transparent binder medium 12. In the FIGURE, the rotating elements 11 are in the form of bichromal rotating elements having segments (hemispheres) with different electrical and optical properties. When voltages are applied to the addressing electrodes, the rotating elements 11 will rotate, presenting either the black segment or the white segment of the rotating elements to the viewer at I.

The rotating elements in the gyricon sheets of the present invention may be any type known in the art without limitation. As is well understood in the art, the only requirement of the rotating elements is that they must have a net charge so the field can pull them out of contact with the cavity walls and they must be electrically anisotropic in the presence of a dielectric fluid so as to be subject to rotation upon application of an electric field, for example as by matrix-addressable electrodes. Typically, gyricon sheets are made up of bichromal balls that are black in one hemisphere and white in the other. The materials producing these colors preferably create electrical anisotropy in the rotating elements.

Other kinds of rotating elements are also known. For example, U.S. Pat. No. 4,261,653, incorporated herein by reference, shows a multi layer ball, although it is made at least in part from glass and its use depends on an addressing scheme involving high-frequency electric fields. U.S. Pat. No. 5,815,306, incorporated herein by reference, shows an array of rotatable lens imaging elements, such as spherical lenses having aperture masks or aperture stops. U.S. Pat. No. 5,717,514, incorporated herein by reference, shows polychromal segmented balls.

In one embodiment, the rotating elements have hemispherical coatings of different zeta potential. For example, the difference in zeta potential can be achieved by applying a coating to one hemisphere of each of the spheres that exhibits optical absorption characteristics, and by applying a coating to the other hemisphere of each of the spheres that exhibits light reflectance characteristics. The difference between the light reflectance-light absorption characteristics of the hemispheres provides a desired optical anisotropy. Specifically, the spheres may be comprised of black polyethylene with a light reflective material, for example, titanium oxide, sputtered on one hemisphere to provide the spheres with the desired light reflective and light absorptive hemispheres.

Due to the difference in zeta potential between the segments of the rotating elements and the immersion of each of the elements in the dielectric fluid, the rotating elements acquire an electrical charge where, for example, one hemisphere is more positive than the other hemisphere of the rotating element. When a power source is applied, the rotating elements can be made to rotate in the electric field developed by the energized electrodes, such that the desired hemisphere can be oriented toward a viewer.

The rotating elements can have a size of from, for example, about 1 to about 400 microns, more preferably from about 20 to about 150 microns, in volume average diameter as measured by a measuring microscope, with hemispheres of contrasting, or different colors.

The rotating elements are embedded in a gyricon sheet of optically transparent binder material, such as an elastomer layer, that contains a multiplicity of spheroidal cavities and is permeated by a transparent dielectric fluid, such as a plasticizer. Each of the spheres is located within a cavity of the transparent material. The cavities have a diameter that is slightly larger than the diameter of the rotating elements so that the rotating elements have rotational freedom with limited translational freedom. Filling the voids between the rotating elements and the cavities is an optically transparent dielectric fluid. The fluid-filled cavities accommodate the balls, one ball per cavity, so as to prevent the balls from migrating within the gyricon sheet. A ball can, however, be selectively rotated within its respective fluid-filled cavity, for example by application of a spatially limited electric field, so as to present a desired segment of the rotating element to an observer viewing the surface of the sheet.

The gyricon sheet thus includes a distribution of minute rotating elements 12 which are electrically, and preferably also optically, anisotropic. Each rotating element is surrounded within a cavity of the binder by a transparent dielectric fluid which causes the rotating elements to have an electrical anisotropy.

The gyricon sheet may be formed by thoroughly mixing the rotating elements with an uncured (liquid), optically transparent material, for example, an uncured elastomer such as Dow Corning Sylgard 182. The optically transparent material is then cured, such as by rapid heating to an elevated temperature. The rotating elements will be embedded in this binder and refrained from either rotational or translational movement.

Following curing of the binder, the sheet is placed in contact with a dielectric fluid for a period of time for the binder to absorb the dielectric fluid and reach an equilibrium point in such absorption.

When the cured binder is placed in contact with the dielectric fluid, the liquid is absorbed by the material resulting in a swelling of the material. The rotating elements are made of a material which does not readily absorb the dielectric fluid, with the result that the swelling of the binder creates the cavities around the rotating elements. The voids or cavities are filled with the dielectric fluid and this structure allows easy rotation of the spheres while permitting very limited translation of the spheres.

The optically transparent binder need not be an elastomer and in lieu thereof may be a rigid plastic such as polyethylene, polystyrene or plexiglass. Encapsulation can be achieved with the encapsulant molten or dissolved in a volatile solvent. An uncured rigid material such as an epoxy can be used as the encapsulant binder provided that it is light transparent. It is still necessary that the material of the gyricon sheet absorb the dielectric fluid more readily than do the spheres in order that the cavities may be formed. When the material of the gyricon sheet binder is an elastomer, the spheres can be plastics such as polyethylene or polystyrene which do not absorb the plasticizer as readily as elastomers. When the material of the binder is a plastic, the spheres must be of a material which does not absorb the plasticizer, such as glass, or absorbs the plasticizer substantially less than the plastic.

It has been found by the present inventor and others that controlling the extent of the swelling of the binder with the dielectric fluid is important in obtaining a display with high brightness. This is because the level of brightness is dependent upon the spacing of the rotating elements within the binder; the closer the spacing, the higher the brightness of the display. See, for example, U.S. Pat. No. 5,808,783, incorporated herein by reference. The rotating elements located in the binder closest to the surface of the sheet as viewed by a viewer are the brightest, with rotating elements beneath this level in the binder being darker because less light reaches these lower rotating elements, and because these lower rotating elements reflect the dark sides of the first level of rotating elements. The more the binder swells during absorption of the dielectric fluid, the greater the spacing of rotating elements, particularly in the first level, exposing greater portions of the lower level rotating elements and thereby darkening the overall display.

It has been found through extensive experimentation by the inventor that the most desirable degree of swelling of the binder with the dielectric fluid is from about 1% to about 20%, more preferably from about 3% to about 10%. By "swelling" herein is meant the extent to which the linear dimensions of the binder sheet increase in size through absorption of the dielectric fluid, as measured by the dimensions of the sheet or by the average size of the cavities created in the binder around the rotating elements as compared to the size of the rotating elements themselves.

It is significant that the absorption of the dielectric fluid by the binder be continued until an equilibrium state has been achieved. If the binder is removed from the dielectric liquid prior to reaching an equilibrium point in the absorption, for example in an effort to stop the swelling of the binder beyond a desired point, the cavities around the rotating elements will not completely fill with dielectric fluid, and the gyricon sheet will not be able to function as a gyricon display. Thus, stopping the swelling prior to reaching complete filling of the cavities with dielectric fluid is not an option for attempting to control the extent of swelling of the binder.

The extent of swelling for a given elastomer is dependent on the swelling capability of the dielectric fluid chosen. It is also strongly dependent on the characteristics of the elastomer. The swelling liquid must have an affinity for the elastomer, of course, if any swelling is to occur. The elastomer is found to swell more if it has a lower elastic modulus. Thus, the Dow Corning Sylgard products are used because their elastic moduli are high for silicone elastomers having a high degree of transparency. However, until now, the dielectric fluid has been chosen based mostly on its low conductivity, viscosity, lack of color and/or safety in handling and use rather than for its binder swelling capability. This was because all dielectric liquids having suitable properties swelled the elastomer about the same amount. Thus, if a chosen dielectric fluid swelled the binder about 25%, for example, the binder was swollen about 25% and a darker gyricon display achieved.

It is very difficult to find a dielectric fluid that causes the desired low swelling level of the binder yet still possesses the other necessary properties of the fluid such as having a low viscosity, being dielectric (very little conductivity), lacking color, safe in handling and use, etc.

In the present invention, it has been found that by using a mixture of liquids as the dielectric fluid, the swelling of the binder can be precisely controlled to within the desired parameters without detracting from the function of the gyricon sheet in a gyricon display. The mixture of dielectric fluids comprises at least two liquids having different binder swelling capabilities.

By "binder swelling capability" as used herein for a given binder is meant the extent to which the liquid will swell the binder at the equilibrium point if the liquid is used alone as the dielectric fluid. The binder swelling capability is associated with the solubility parameter of the liquid with the binder material.

Another way to phrase the swelling capabilities of the liquids is to say that at least one of the liquids acts as a host liquid which is imbibed by the binder to swell the binder to a higher degree compared to at least one other liquid that acts as a guest liquid. By using the guest/host approach, a desired swelling degree can be easily achieved, and thus an important requirement for a gyricon display having high brightness can be easily achieved.

As discussed above, the desired degree of swelling of the binder is from about 3% to about 15%, preferably from about 5% to about 10%.

Preferably, the dielectric fluid comprises a mixture of liquids in which at least two of the liquids of the mixture differ in binder swelling capability by at least about 5%. More preferably, the mixture of the at least two liquids comprises at least one liquid having a binder swelling capability of at least about 5%, preferably at least about 10%, and at least one liquid having no binder swelling capability.

Partially fluorinated materials such as, for example, 3M HFE 7100, a partially fluorinated hydrocarbon made by 3M, Isopar L or Isopar M, which are aliphatic hydrocarbons made by Ashland Chemicals, or Freon TF, a partially fluorinated polyethylene, is most preferably used as the dielectric fluid that is capable of swelling the binder to create cavities therein around the individual rotating elements. 3M HFE 7100 swells an elastomeric binder about 10%, Freon TF swells an elastomeric binder about 40%, and Isopar L swells a binder about 25%.

The use of fluorinated liquids is desirable because such materials have a low refractive index. In contact with a white side of a rotating sphere, for example comprised of titanium dioxide, light scattering is enhanced, thereby further increasing the display brightness.

As the liquids that swell the binder to only a very minor degree or not at all (i.e., have no binder swelling capability), suitable examples include fully fluorinated materials such as, for example, perfluorooctane that causes no swelling of an elastomeric binder, natural vegetable oils such as, for example, soybean oil, coconut oil, etc., which cause no swelling of an elastomeric binder, and low molecular weight trigliceride liquids such as, for example, tributyrin and tricaproin, which cause no swelling of an elastomeric binder. Preferably, the lower swelling liquids are soluble in the higher swelling liquids so that the mixture may be uniform and the materials taken up uniformly together.

Of course, combinations of materials that both swell the binder, but to different degrees, can be used. For example, a mixture of 3M HFE 7100 (elastomer swelling capability of about 10%) and Isopar L (elastomer swelling capability of about 25%) can be used with success.

The amount of each liquid to include in the mixture is dependent upon the degree of swelling of the binder possessed by each liquid and the desired degree of swelling of the binder. The binder swelling capability of a liquid can be readily determined via routine experimentation, and thus the necessary amounts of each liquid to include in a mixture to achieve a desired swelling can also readily be determined via routine experimentation.

Although it is preferable for the dielectric liquid to be comprised only of the guest and host liquids, it is possible to also include any other desired materials in the mixture. Solvents may be used, if needed.

In another preferred embodiment of the invention, the dielectric fluid mixture of at least two liquids comprises at least one host volatile liquid having a binder swelling capability and at least one guest non-volatile liquid having no binder swelling capability. In this embodiment, following absorption of the dielectric liquids by the binder, the sheet is then subjected to evaporation conditions, for example heating, to evaporate off the host volatile liquids. Only the non-swelling guest liquids remain within the cavities of the sheet. The advantage of this embodiment is that the extent of swelling can be very closely controlled at the low end of the swelling range. That is, the swelling can be controlled to be at or just above a minimum swelling needed to provide a cavity in which the rotating sphere can freely rotate, through use of a majority of non-swelling liquid and subsequent evaporation of the swelling liquid.

3M HFE 3100, a partially fluorinated liquid, will readily mix with many fully fluorinated fluids. It is found that such materials will not dissolve the polyethylene balls at temperatures exceeding the melting point of the ball materials. Since dissolution of the balls in the plasticizer liquid at high temperatures is an important failure mechanism for gyricon balls at elevated temperatures, this has importance in is obtaining high temperature performance with gyricons.

Although the invention has been described with reference to specific preferred embodiments, it is not intended to be limited thereto. Rather, those having ordinary skill in the art will recognize that variations and modifications may be made therein which are within the spirit of the invention and within the scope of the claims.

What is claimed is:

1. A gyricon sheet comprising a binder containing rotating elements, wherein the binder has cavities larger than the rotating elements around each of the rotating elements, and wherein the cavities are filled with a dielectric fluid consisting of a liquid that has no binder swelling capability.

2. The gyricon sheet according to claim 1, wherein the gyricon sheet is swollen from about 1% to about 20% by the dielectric fluids.

3. The gyricon sheet according to claim 1, wherein the gyricon sheet is swollen from about 3% to about 10% by the dielectric fluids.

4. The gyricon sheet according to claim 1, wherein the liquid is selected from the group consisting of fully fluorinated material, vegetable oil and trigliceride liquid.

5. The gyricon sheet according to claim 1, wherein the binder comprises an elastomer.

6. A method of making a gyricon sheet, comprising
    curing a binder containing rotating elements to form a sheet, and
    placing the sheet in contact with dielectric fluids to permit absorption of the dielectric fluids into the sheet, thereby swelling the binder and creating cavities larger than the rotating elements around each of the rotating elements in the binder, the cavities filled with the dielectric fluids,
    wherein the dielectric fluids comprise a mixture of at least two liquids comprising at least one volatile liquid having a binder swelling capability and at least one non-volatile liquid having no binder swelling capability, and
    wherein the method further comprises evaporating the at least one volatile liquid.

7. The method according to claim 6, wherein the at least one non-volatile liquid is selected from the group consisting of fully fluorinated material, vegetable oil and trigliceride liquid.

8. The method according to claim 6, wherein the gyricon sheet is swollen from about 1% to about 20% by the dielectric fluids.

9. The method according to claim 6, wherein the gyricon sheet is swollen from about 3% to about 10% by the dielectric fluids.

10. The method according to claim 6, wherein at least two of the liquids of the mixture differ in binder swelling capability by at least about 5%.

11. The method according to claim 6, wherein the volatile liquid has a binder swelling capability of at least about 10%.

* * * * *